United States Patent [19]

Jonsson

[11] Patent Number: 5,699,053

[45] Date of Patent: Dec. 16, 1997

[54] PERSON PAGING METHOD

[75] Inventor: Björn Erik Rutger Jonsson, Järfälla, Sweden

[73] Assignee: Telefonaktiebolaget LM Ericsson, Stockholm, Sweden

[21] Appl. No.: 446,484

[22] Filed: May 22, 1995

Related U.S. Application Data

[63] Continuation of Ser. No. 18,212, Feb. 16, 1993, abandoned.

[30] Foreign Application Priority Data

Feb. 17, 1992 [SE] Sweden ................... 9200466

[51] Int. Cl.⁶ ........................................ H04Q 1/00
[52] U.S. Cl. .................. 340/825.44; 340/825.36; 340/825.49; 379/57; 379/210
[58] Field of Search ................ 340/825.44, 825.36, 340/825.37, 825.49, 825.45; 379/56, 67, 60, 210, 212

[56] References Cited

U.S. PATENT DOCUMENTS

| | | |
|---|---|---|
| 4,172,969 | 10/1979 | Levine et al. |
| 4,313,035 | 1/1982 | Jordan et al. .................. 379/61 |
| 4,763,191 | 8/1988 | Gordon et al. ................. 379/94 |
| 4,899,375 | 2/1990 | Bauer et al. .................. 379/264 |
| 4,910,766 | 3/1990 | Ogino et al. .................. 379/201 |
| 4,933,966 | 6/1990 | Hird et al. .................... 379/132 |
| 5,168,515 | 12/1992 | Gechter et al. ................ 379/210 |
| 5,315,635 | 5/1994 | Kane et al. .................... 340/825.44 |

FOREIGN PATENT DOCUMENTS

| | | |
|---|---|---|
| 0 140 351 | 5/1985 | European Pat. Off. |
| 0 435 449 | 7/1991 | European Pat. Off. |
| WO89/10044 | 10/1989 | WIPO |
| WO92/01350 | 1/1992 | WIPO |

*Primary Examiner*—Brian Zimmerman
*Attorney, Agent, or Firm*—Burns, Doane, Swecker & Mathis, L.L.P.

[57] ABSTRACT

A paging method in which a first user wishes to page and transmit a message to a second user with the aid of a paging service. The first user requests paging of the second user at a paging central which offers an alerting service and a message service which supplements the alert with the message. The paging central alerts the second user by means of the alerting service. The paging service is not associated with any particular telecommunication network, but can be performed in at least one telecommunication network chosen from among at least two possible telecommunication networks. The message service is also made independent of the alerting service, in that the message service is not activated until a request to do so is received from the aforesaid first telecommunication network while the message service utilizes at least one telecommunication network which is selectively different from the first-mentioned network. The message is not transmitted until the aforementioned request is received.

12 Claims, 12 Drawing Sheets

PERSON PAGING METHOD

This application is a continuation, of application Ser. No. 08/018,212, filed Feb. 16, 1993 now abandoned.

TECHNICAL FIELD

The present invention relates generally to the field of communication services which are performed through selected telecommunication networks. The invention relates in particular to a person paging method.

The present invention is related to the following five copending patent applications, to which the following description refers:

1) "A Method of Establishing an Intelligent Network Service", U.S. Pat. No. 5,414,752.
2) "A Method of Establishing a Connection", U.S. patent application No. 08/018,214.
3) "A Method of Organizing Communication", U.S. patent application No. 08/018,223.
4) "A Method of Establishing Cooperation with a Functionality", U.S. patent application Ser. No. 08/018,268; and
5) "A Method of Supporting Communication", U.S. patent application Ser. No. 08/018,213.

These applications and describe mechanisms which can be used in the method according to the present invention.

TECHNICAL BACKGROUND ART

The term communication services is meant to mean conventional telephony services, telex services, datapack services, datel services, telefax services, videotext services, ISDN-services, mobile telephony services, personal paging services, tele-point-services and general communication between two or more parties. The services recited above are only examples of the services possible and are not intended to limit the scope of the invention.

The term telecommunication network is normally meant to mean the telephone networks, telex networks, circuit connected data networks, picture information transfer networks, private telecommunication networks, radio networks, satellite communication networks and general carriers of the communication services, such as analog transmission, digital transmission, synchronous, multiplex or asynchronous multiplex transmission, ATM, etc., for example. These networks are recited solely by way of example and the invention is not restricted thereto.

The term functionality is meant to mean the ability to perform an operation in a telecommunication network. Examples of functionality include activities and services that can be performed in the telecommunication network. Examples of functionalities include an enquiry to establish a connection path or route between two parties, digit analysis, billing or ticketing. Although not necessary, the functionality may require the availability of dedicated equipment for carrying out the functionality. For instance, if the functionality is to receive tones and to analyze tones, it is necessary to make a tone receiver accessible. Other examples of functionalities include voice-controlled speech information, number translation service, conference calls. Other examples of functionality include the functionalities described in the aforesaid five Swedish patent applications, namely communication in the form of a meeting, personal paging, a method of establishing cooperation with a functionality, meeting connection establishment and communication via intermediaries. Still another example of functionality is the ability of being able to choose from among several alternatives.

The term connection is meant to mean a circuit-coupled connection or a package-coupled connection. The term to establish a connection is meant to mean in the circuit coupled case that a circuit-coupled connection is established between two hardware terminal devices (or equipment) and in the package coupled case it is meant that a package-coupled connection creates relationships between logic channels on node-interconnecting physical links which. The term to originate or to terminate a connection, is meant to mean in the circuit-coupled case to connect originating or terminating equipment to a circuit-coupled connection, and in the package-coupled case to create a session between applications in originating and terminating nodes respectively.

The term user is meant to mean in the following a human user or a computer-based application which utilizes communication services. The application may be achieved with hardware, software and combinations thereof. The word "part" is synonymous to the term user.

The term terminal is meant to mean equipment which is connected to a telecommunication network and which makes the telecommunication services of the network available to a user.

The term port either refers to an access port or to a transit port. An access port is a location where a dedicated terminal is connected to a telecommunication network. An access port is associated with a destination address which goes to an end user. In the case of a standard telephone network, the access ports are located in a telephone station. In the case of the ISDN-network and the mobile telephone network, the access ports are found in a terminal. A transit port is a port in a connection between nodes. A transit port is not associated with any particular destination address, and can be used to establish any selected connection with a final destination. The final destination is given by the destination address. A transit port can transfer a call to another node or can receive a call from another node.

The final destination of a call is a terminal which is identified by a destination identity. The terminal can be present in the same node as a transit port or in some other node to which the call shall be further connected.

One fundamental feature of present-day communication services is that when a party, hereinafter called A, wishes to communicate with another party, hereinafter called B, A sends a call to B, whereupon a connection is established between A and B. The call and the establishment of a connection route is a coupled sequence. That is the information which A uses in the call, namely information relating to the identification of B's access point in the telecommunication network, causes a connection route, or path, to be established between the parties. This connection can either be circuit-coupled or, in the case of non-continuous transmission methods, a so-called virtual connection, e.g. a package-coupled network, ATM-network (asynchronous transfer mode), etc. Traditionally, a connection is established by establishing a route from an origin to a destination. The connection route through the telecommunication network is controlled by fixed, so-called routing tables which are drawn up when configuring or reconfiguring the network. The routing tables may sometimes permit alternative selections, based on local accessibility information.

The traditional communication network is encumbered with many drawbacks. A first problem concerns handling of the resources of the communication network. Firstly, the communication network is, in itself, a resource which is utilized uneconomically in the traditional method of providing communication services. For example, when party A calls party B, so as to establish a connection through the network from A to B, and party B does not accept the call, the network resources have been used unnecessarily. The same applies when party B is engaged. The case is dependent on the predominant use of present-day networks of channel-associated signalling. This involves establishing a signalling connection, which is then used for speech purposes. With common channel-signalling, which is used primarily in the long-distance network, the signal connection is established with the aid of the data package, or packet, whereas the speech connection, the expensive part of the communication, is not established until B answers. Common channel-signalling is scarcely used in local networks. Secondly, the majority of all established connections do not require party B to act immediately on the information that A will transfer.

In the aforesaid cases, the network resources are either used unnecessarily or are utilized in real time, although it would be possible to utilize the resources at a later time.

Present-day telecommunication services do not enable a party A to call a party B on a telecommunication network and establish communication with party B on another telecommunication network different to the first-mentioned network. If B has access points in several telecommunication networks, it is necessary for party A to be aware of all these access points in order to be able to utilize alternative methods of communicating with B. If party B does not answer in one telecommunication network, it is necessary for party A to attempt to reach party B in another communication network. This means that it is necessary for party A to call on network after network before finally reaching party B. Furthermore, it is also necessary, of course, for party A to have in his/her possession a list of party B's access ports in the different networks at the disposal of party B.

Several different paging methods or systems are known to the art. A common feature of these methods is that each method uses its own paging network and its own paging central. The paging network is usually a radio network. A large hotel and even a large company may use the telephone network as its paging network. Those customers which subscribe to or are subject to person paging services have an electronic unit which receives a paging signal broadcasted by the paging central. Depending on the paging method concerned, the electronic unit either responds to the paging signal with solely an alert signal or with an alert signal which is accompanied with a message. The alert signal may be an audio signal ("beep"), an optic signal or a combination of the two. The message may, for instance, be a visual indication of a telephone number which the paged person is asked to call, or a visual indication of a short text message directed to the paged person. The visual indication discloses what action the paged person should take, normally to ring an indicated telephone number. When the electronic unit responds to the paging signal with solely an alert signal, the paging central and the paged person will have previously agreed on the procedure that is to be followed when an alert signal is received, normally that the paged person shall ring a predetermined telephone number.

The drawback with these known person paging methods is that the paging service is active only in that paging network which is at the disposal of the paging central. This is because the subscriber electronic units are comprised principly of two units, to wit a paging signal receiving unit and a message presentation unit which receives and presents the message that is to be indicated visually, these two units being mutually combined and integrated with the aforesaid paging network which the paging central has at its disposal. A customer, referred to as B, who subscribes simultaneously to a paging service in a first network and also to a paging service in another network which is separate from the first network cannot therefore page simultaneously in the first and the second paging networks since the paging centrals of said two networks do not cooperate with one another. The customer requesting the paging service, called A, is first necessitated to direct his paging request to the operator of the first paging network and inform the operator of B's access point in the first network. If party B does not answer, party A must direct a new paging request to the operator of the second paging network and again inform the operator of B's access point in the second paging network, this latter access point being different to the access point in the first paging network.

Another drawback with the known paging methods is that the reference transmitted with the paging message refers to a person or to a message storage device which delivers a message. When seen from the aspect of the person or the message storage device concerned, these known methods are unsuitable in those instances when a large number of messages directed to a large number of different addressees, or destination addresses, are stored in one and the same storage device. When an addressee who has been alerted by the paging network contacts the storage location in which the message is stored, it is necessary for the addressee to prove his/her identity, whereafter a search is made through all of the stored messages until the correct message is found, i.e. the message that is addressed to the addressee.

The European Patent Specification 140,351 teaches a system for increasing the range of cordless telephones. A cordless telephone coacts through a radio connection with a fixed or stationary telephone that has access to the telephone network. The range of the cordless telephone is restricted to the near vicinity around the fixed telephone. In order to increase the range of a mobile cordless telephone, such that a mobile cordless telephone A-MOBILE which is located within the range of its fixed telephone A-FIA will be able to establish a connection with another mobile cordless telephone B-MOBILE which has its own stationary telephone B-FIA whose range does not overlap the range of the A-FIA telephone, it is proposed to provide the stationary telephones A-FIA and B-FIA with an additional unit which coacts with a paging system having a range which will reach both A-TEL and B-TEL, via a switch in the telephone network. A connection from A-MOBILE to B-MOBILE is established by A-MOBILE making a call and giving the telephone number of the B-MOBILE. The stationary telephone A-FIA of the A-MOBILE adds an A-FIA-ID to the B telephone number, this identity reference being transmitted to the switch and from there to the paging system. A-FIA then releases its connection with the switch or exchange. The paging signal received by the B-MOBILE contains the reference A-FIA-ID. The person served by B-MOBILE can then make a call, via an FIA-terminal, here called B-FIA, and state A-FIA-ID as the destination. The call proceeds from the B-MOBILE via B-FIA, via the switch or exchange, to the idle A-FIA and contact between the parties is established. Roughly speaking, the communication method taught by this European patent specification can be said to involve a conventional A-number transmission process in which the A-number is transmitted through the paging network. One drawback with this known system is that A-FIA must release its connection with the exchange before it can receive a signal from the B-MOBILE. This implies the further drawback that any one whomsoever can ring to A-FIA after A-FIA has released its connection with the exchange, or switch. Thus, a third party is able to call the A-MOBILE despite the A-MOBILE having ordered a call with the B-MOBILE. The switch is unable to determine which of the calls incoming to A-FIA shall be allowed through. The switch is completely unaware of whether there is a prevailing relationship between A-FIA and B-FIA or not, and the switch is even less able to handle such a relationship. Another drawback with this known system is that all of the stationary telephones and all of the mobile telephones and the whole of the paging system must be designed in a particular manner in order to be able to function together. The investment costs required in order for the system to function satisfactorily are therefore considerable.

There is used in Taiwan a communication system in which when a party or subscriber A wishes to talk with a party or person B in the possession of a mobile telephone, party A requests paging of party B and states his A-number. Party A then releases his connection. In the paging process, the A-number is sent to B's paging apparatus. Party B now rings the A-number on his mobile telephone. A connection is therewith established from party B to party A. One drawback with this method is that the reference transmitted to party B, i.e. the A-number, points to hardware, i.e. to A's telephone apparatus, and that A must release his connection in order for a connection from party B to be coupled to the party A. Another drawback is that party A is not certain that it is party B who is calling when A's telephone rings, since some other subscriber may ring party A before party B has had time to call.

U.S. patent application Ser. No. 686,600 filed on the 17th Apr. 1991 and carrying the title "A Communication System for Integrating a Paging System with Cellular Radio Telephones" (Ericsson docket LM 5456) with the same Applicant as the present invention, describes a cellular mobile telephony system having mobile telephones which include integrated pagers. If the mobile telephone is switched-off but the pager is active, an incoming call to the mobile telephone will cause a broad range paging network to transmit a paging signal which is received by the paging device of the mobile telephone, this paging device, in response to the signal, "alerting" the mobile telephone and causing the telephone to register itself. The network then steers the call to the mobile telephone by repeating the paging process, although now over the cellular mobile telephone network.

The system described also includes a cooperation facility between the stationary telephone network, the paging network and the mobile telephone network.

SUMMARY OF THE DISCLOSURE

The inventor has found that many of the aforesaid drawbacks can be avoided with the aid of a novel type of communication system in which party A communicates with party B indirectly, via an intermediary M. The desired communication between party A and party B can then be handled by the network as two separate communication processes, namely one communication process from party A to the intermediary and another communication process from the intermediary to party B. In this case, it is applicable to both A and B that respective parties communicate with the intermediary, such as A to M and B to M, respectively, and consequently the intermediary M need not be aware of how party A and party B can be reached. The intermediary can, in turn, be comprised of a chain of mutually cooperating intermediaries. In its basic form, this principle can be used for indirect communication, although the possibility of direct interactive communication between A and B is then lost. The intermediary is able to communicate with party B without party A needing to know the access port of party B. However, if party B fails to contact the intermediary, A's communication requirement remains and party A must make a new call. Indirect communication between the parties concerned implies that party B can call the intermediary in order to check whether there is a message addressed to B for collection. Party A knows that the message shall be sent to the intermediary, but need not know the location from which party B has called the intermediary. The intermediary is, in this case, passive and has the role of a called party both from party A and from party B. When this communication principle is applied via an intermediary in a person paging process, it is the paging central which functions as the intermediary.

One characteristic feature of the inventive concept on which all of the aforesaid patent applications are based is that the communication service is divided into a separate negotiating phase and a separate connection establishing phase. The connection establishing phase is first initiated when both of the parties have accepted that communication shall take place and also when the respective access points of the parties concerned have been confirmed to the parties. The term separate is meant to mean that the coupled sequence between calling and establishing a connection route is interrupted or broken in time and in space. By interruption of the switched sequence in time, it is meant that the negotiating phase of a communication service is separated from the establishment of a connection route. A connection route is not established until both parties are agreed that the communication phase of the connection shall take place. As a result, the time at which a connection route is established is delayed with respect to the time at which the call was made, although the invention does not exclude the time at which the connection route is established from coinciding directly with the time at which the call was made, provided that certain conditions are fulfilled.

By interrupting the switched sequence in space, it is meant that the connection route between the parties need not necessarily be established over the same telecommunication network or networks as that or those over which the negotiating phase takes place. However, the invention does not exclude maintaining the space switching process, i.e., by using the same telecommunication network or networks over which the call was made for communication between the parties concerned.

Another characteristic feature of the inventive concept that forms the basis for all said six patent applications is that a first party manifests its wishes by establishing communication with a second party by making a call to a third party, this third party being called either a meeting broker, meeting organizer, service requesting central, paging central or electronic secretary, depending on the service requested, and registers the call, assigns an identification reference to the call and negotiates with, or has already negotiated with, the first and the second parties with regard to those conditions or terms on which a connection shall be established therebetween. The terms or conditions negotiated include, among others, an appropriate time at which a connection route shall be established between the parties in order to therewith initiate the communication phase of the connection. The third party may also send the identification reference to each party, so as to enable each party to establish contact with the other party on a later occasion.

Because the third party is aware that the first and the second parties are prepared to begin the communication phase, the third party can assist in selecting the place at which the first and the second parties shall meet. This meeting place may be located at the access point of the first party in a communication network, an access point of the second party in another communication network, or in access points in a telecommunication network to which the first and the second parties both have access. The access points of the first and the second parties are mutually connected in this common telecommunication network. This provides a large degree of freedom in the selection of a meeting place. A route between the first and the second parties need not be established in agreement with fixed routing tables, but can be selected with regard, for instance, to prevailing traffic conditions in the common telecommunication networks at the disposal of both parties.

When the invention is practiced in conjunction with a paging process in which a first party, party A, wishes to page a second party, party B, and to deliver a message to the latter party by utilizing a paging service, the message service of the paging service can be made independent of the alerting service by not activating the message service until requested to do so by the second party B. The advantage of this is that the paging service can be carried out in several paging-telecommunication networks at the disposal of the called party, party B, without the calling party, party A, needing to be aware of the identity or access identity of the called party, party B, in the various paging networks.

One object of the present invention is to utilize existing networks and the resources of existing networks more effectively than has been achieved hitherto.

Another object of the invention is to provide a paging method which will enable the paged person to be alerted at one and the same time over selected telecommunication networks at the disposal of the paged person.

A further object of the invention is to provide a paging method in which a call implies a request for an alerting service. The request is made by a paging central which sets the alerting service in motion, by sending an alerting signal over the aforesaid selected telecommunication networks. The request is made either by the called party or by the called party's agent.

Still another object of the invention is to provide a paging method in which a call does not unconditionally trigger activation of a network with the intention of transmitting a message to the called party.

The inventive paging method shall also render it unnecessary for the network in which the message is switched between the parties to store and update the users' access points in this network.

Another object of the invention is to provide a paging method in which it is not necessary for the calling party to have knowledge of the access points of the called party in all of the telecommunication networks at the disposal of the called party.

A further object of the invention is to provide a paging method in which the paging message includes a reference to a separate message and also to the location or place of the storage device.

Another object of the invention is to provide a paging method in which information relating to the paging party is stored together with the message, so that the paged party is able to use this information when wishing to leave an answer message.

One characteristic feature of the invention is that the message service is made independent of the alerting service, by not activating the message service until requested to do so by the paged party.

According to one feature of the invention, the message which the first party, i.e. the party requesting the paging service, desires to send to the paged party is (a) sent to the paging central, (b) is stored in a first storage location and (c) is provided with the aforesaid reference called the calling identity, which relates the message left by the first party to the paged party.

BRIEF DESCRIPTION OF THE DRAWINGS

Various exemplifying embodiments of the invention will now be described in more detail with reference to the accompanying drawings, in which.

DETAILED DESCRIPTION OF THE DISCLOSURE

Figure 1:
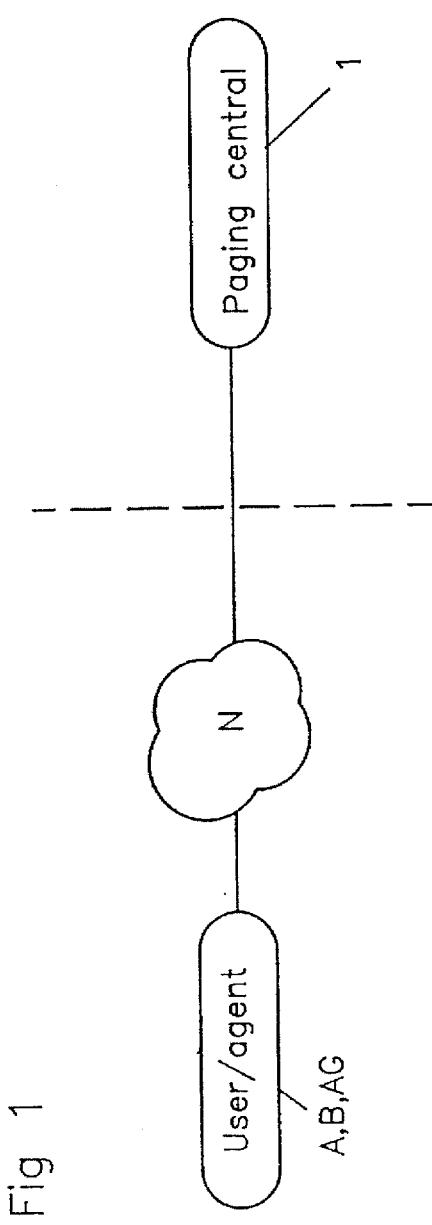
FIG. 1 illustrates schematically a first environment in which the inventive paging method is applied.
Figure 2:
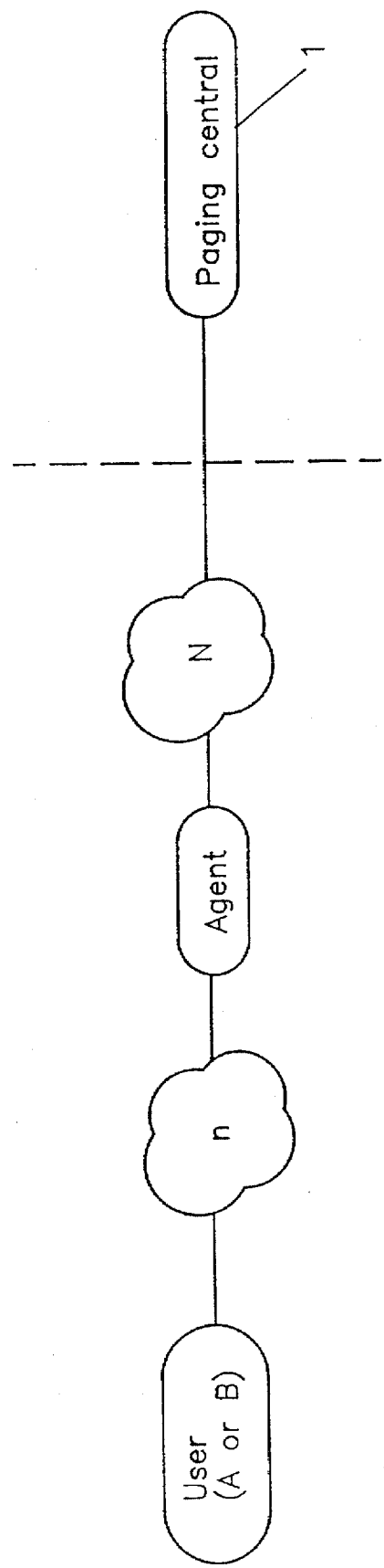
FIG. 2 illustrates schematically a second environment in which the inventive paging method is applied.

FIGS. 1 and 2 are block schematics showing two different environments in which the inventive communication method is applied. Each of the environments includes a paging central 1, shown to the right of the broken line in FIG. 1, while a customer or user of the paging central is shown to the left of the broken line in FIG. 1. The customer in the FIG. 1 illustration may be either a user A or a user B, or an agent AG of the user A or the user B, the agent being in connection with the paging central via a telecommunication network N. In the FIG. 2 illustration, the client is a user A or B who is in connection with his agent AG(A) or AG(B) via a network n. In turn, the agent AG(A) or AG(B) is connected to the paging central 1 via a telecommunication network N, which may be different to or the same as the network n.

When a party, referred to below as party A, wishes to establish communication with another party, referred to as party B, the party A, the customer, requests paging of party B and leaves the message he wishes to deliver to party B. The request, or order, is delivered by an intermediary, the paging central 1. It is then the duty of the paging central to page B and initiate transmission of the message and also to transmit any reply message from B to A.

Figure 3:
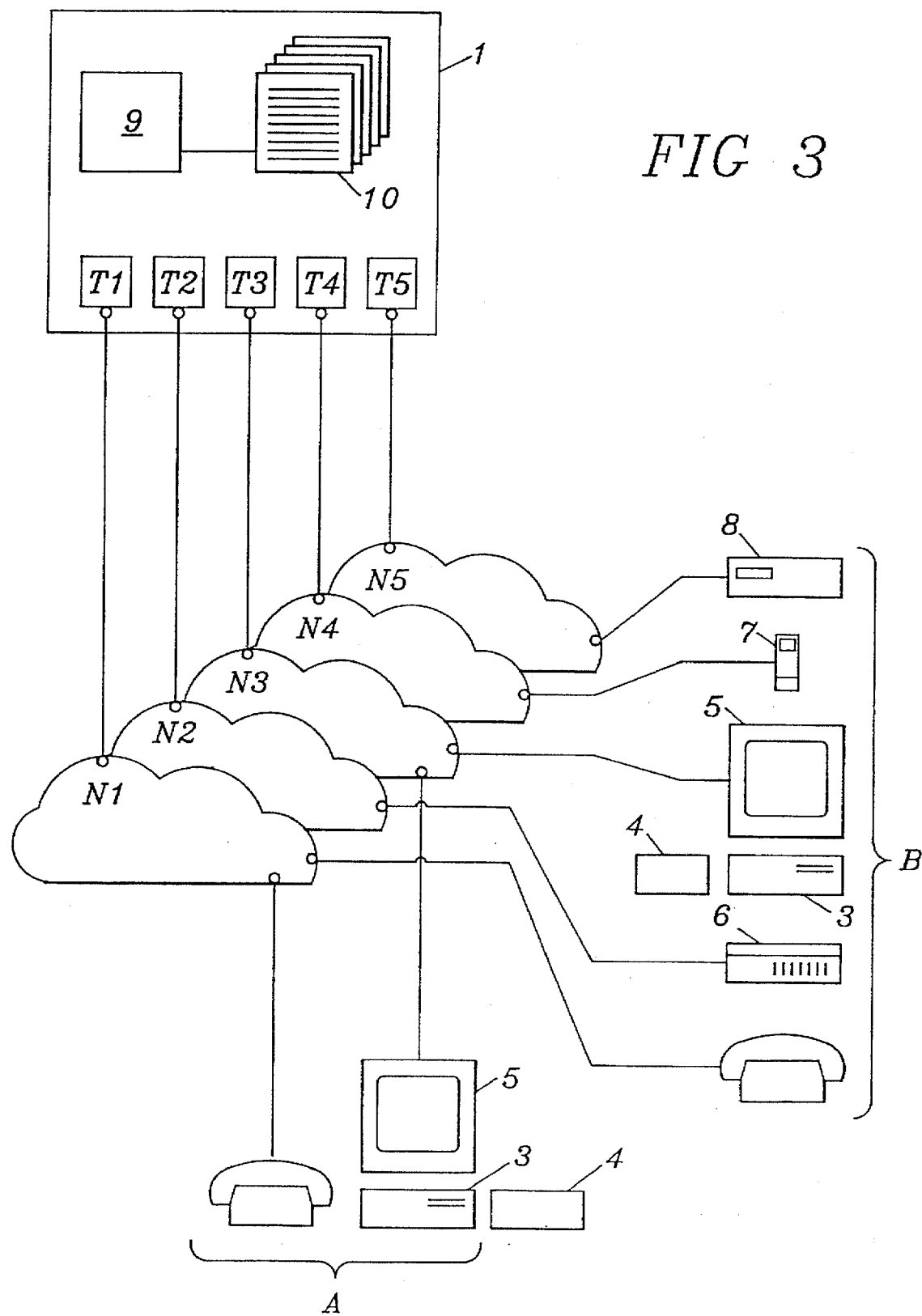
FIG. 3 is a block schematic illustrating the terminals which are included in a communication system that uses the inventive paging method in the environment illustrated in FIG. 1.

FIG. 3 is a block schematic which illustrates an environment according to FIG. 1 in which two users A and B subscribe to services in different telecommunication networks N1–N5. The network N1 is the standard telephone network, the network N2 is a telex network, the network N3 is a packet-switching data network, the network N4 is a car telephone network, and the network N5 is a paging network, for instance a radio network. The user A subscribes to services in networks N1 and N3, whereas the user B subscribes to services in all networks N1–N5. The user A thus has a conventional telephone and a terminal unit which affords user A access to the packet-switching data network. This terminal unit is illustrated symbolically and comprises a central unit 3, a keyboard 4 and a display screen 5. The user B also has a telephone, a telex 6, a terminal unit to the packet-switching data network, this terminal unit also being shown symbolically and comprises a central unit 3, a keyboard 4 and a display screen 5. The user B has a mobile telephone 7 which is connected to the mobile telephone network N4. Finally, the user B has a paging receiver 8 which is connected to the paging network N5. In the illustrated embodiment, the paging receiver is of the kind which, when party B is paged, generates a tone and shows a destination address plus a message reference on a presentation window. When the tone sounds and the destination address is shown, the user B knows that a message having the reference stated is found for collection at the stated destination address.

The paging central 1 includes a number of terminal units T1, T2 . . . T5, a central processor 9 which is controlled by a number of program modules shown schematically at 10. The terminal unit T1 is connected to the network N1, T2 is connected to the network N2, and so on. Since each terminal unit T1–T5 shall originate, and in applicable cases also terminate, thousands of connections at one and the same time, these terminal units T1–T5 differ from the terminal units used by the users A and B in respective networks. For instance, the terminal unit T1 is a telephone exchange, whereas the terminal units of respective users comprise conventional telephones. Similarly, the terminal unit T2 is a switch, whereas corresponding user terminal units are conventional telex apparatus. It will be understood that the terminal units T1–T5 may, in turn, include software-controlled processors. The central processor 9 has software for executing the inventive paging method and therewith coacts with one of the terminal units T1–T5.

Each user A, B has its respective access point to respective networks. These access points are shown by a round ring in the Figure. The access point is normally a terminal unit interface and is associated with user identification, such as a telephone number, a mobile telephone roaming number, etc.

All users who/which subscribe to the paging service are registered at the paging central 1. The paging central also has information concerning the telecommunication network N at the disposal of respective users. This information is obtained when respective users subscribe to the paging service. The paging central 1 also has information concerning the access points of each user in respective telecommunication networks. All of this information is stored in a database (not shown) to which the central processor 9 has access. In order to obtain knowledge of the roaming number of an individual mobile telephone, the central processor 9 turns to the home location register HLR (not shown) of the mobile telephone network. This register contains information as to the whereabouts of the base station within whose covering range the mobile telephone is located at the present time and also information concerning the roaming number that has been assigned to the mobile telephone by said base station.

When the user A wishes to establish communication with the user B by means of the inventive paging method, the user A requests paging of B at the paging central 1, by using one of the networks at the disposal of user A, in the illustrated case either the telephone network or the packet-switching data network. The paging central 1 offers an alerting service and a message service. The alerting service functions to produce an alerting signal which alerts the paged user B to the fact that he is being sought. In the case of the preferred embodiment of the invention, this alerting signal is supplemented with a reference to the place at which a message is stored and another reference to the actual message itself. The message service supplements the alert function with the message that the user A wishes to deliver to the user B. The message may, for instance, be a telephone number, which is shown in the display window of the paging receiver 8, a voice-controlled message which B receives on the mobile telephone, an alphanumeric message which B receives on the packet-switching network, an alphanumeric message which B receives on the telex apparatus, or a voice-controlled message which B receives on his telephone.

An alerting signal transmitted over the telephone network may, for instance, have the form of a very short ringing tone transmitted at regular intervals, for instance every five seconds. The alerting signal in the telex network may, for instance, be a short ringing signal on the bell of the telex apparatus and/or a flashing optical signal. The alerting signal in the packet-switching data network may have the form of a flashing optical signal from a light-emitting diode mounted on the outside of the central unit 3. The alerting signal may be generated in the mobile telephone network in the form of a short "beep" transmitted at regular intervals, for instance every five seconds, on the calling channel of a base station. Combinations of optical and acoustic signals can also be used.

A number of activities, described below, are performed when the paging central receives a paging request, whereafter the paging central sends an alerting signal to the paged user A. The alerting signal can either be transmitted on all networks N1–N5 simultaneously or may be transmitted in sequence from network to network among those networks at the disposal of user B. The paging process may also be effected in a given order of priority, for instance, by always beginning with the paging network, and then switching to the telephone network, and then the mobile telephone network, and then the packet-switching data network and, finally, the telex network. The alerting signal may also be transmitted once or several times in each network. In principle, nothing happens thereafter. The user B has either noticed the alerting signal but does not wish to answer immediately, or the user B has not noticed the alerting signal. It is assumed, however, that user B finally receives the alerting signal and that user B is thus aware that he is being paged.

At the first suitable opportunity, the paged user B responds to the alerting signal by contacting the paging central 1 via one of the telecommunication networks at the disposal of user B, with the intention of requesting collection of the message which user A asked to be delivered. In an alternative embodiment, user B does not have access to the whole of the message, but only to a short title under which the message is stored. The user B informs the paging central of the network over which he wishes the message to be sent. If the message is stored in the paging central, the paging central will then transmit the message on the network requested. When the alerting signal is supplemented with a message reference, user B will also state this message reference when making contact with the paging central.

As will be described in more detail below, the message may be stored in some other place and the paging central will then give the paged user B a directive as to where the message can be collected, i.e. in which network and on which access point in said network the message is found. When applicable, the paging central will also give a message reference. When the paged user B has collected the message, the paged user will send to the paging central 1 an acknowledgement to the effect that he has received the message. The paging user A can check with the paging central as to whether the acknowledgement has been received or not, or, alternatively, the paging user A may reach an agreement with the paging central that the paging central forwards the acknowledgement to user A upon receipt of the message.

The paged user B may also send a reply message to user A, together with the acknowledgement.

The inventive communication process is finalized when the paging user A is in receipt of an acknowledgement to the effect that his message has been received by user B. If the user A does not receive any such acknowledgement, he can repeat his request for paging of user B.

In conjunction with a request by user A to the paging central to page user B, the paging request, or order, is given an updating identity AI and the paging central and the user A negotiate with regard to the place where the message that user A wishes to deliver to user B shall be stored. This storage place may either be located in the paging central, with the user A or at some other location in a specified telecommunication network. The message may be given a short title which is transmitted to the user B when the user B requests a message transfer. The user B may have received several messages and is able to choose those messages which he wishes to collect from the storage place on the basis of these short titles. The short title of the message may be stored at a place which is different from the place at which the actual message is stored. One suitable procedure is to store the short title in the paging central and to store the message section with the paging user A. When the paged user B requests transmission of the message, the paging central sends only the short title to user B together with information that the remainder of the message can be collected at user A. Alternatively, the paging central and the user A may have agreed that the paging central will not transmit the message stored at user A to the paged user B until user B requests transmission of the message section of said message.

A destination address which is general for all paging requests and which leads to the paging central may be used as updating information. Alternatively, a geographically differentiated destination address which leads to a paging central within respective geographic regions may be used as updating information. This will enable the paged user who uses the updating information as a destination address when calling the paging central to be connected to the paging central which is located in the geographic region from which the paging request came. As another alternative, the updating information may be individual to each incoming paging request. In this case, the individual destination address, which leads to the paging central and which is used by the paged user when communicating with the paging central, is chosen from among those individual destination addresses which are included in the number series to the node in which the paging central is located in that telecommunication network in which it has been elected to communicate.

The acknowledgement of receipt of a message is sent to the paging central optionally together with a reply message.

According to an alternative embodiment, the acknowledgement can also be sent to the message storage place.

According to one embodiment of the invention, the acknowledgement sent by the paged user B together with any reply message is presented to the user A together with the aforesaid updating identity AI for use by the user A when he next contacts the paging central, i.e., after the paging request. This informs the paging user A that a message has been received by user B.

Figure 4:
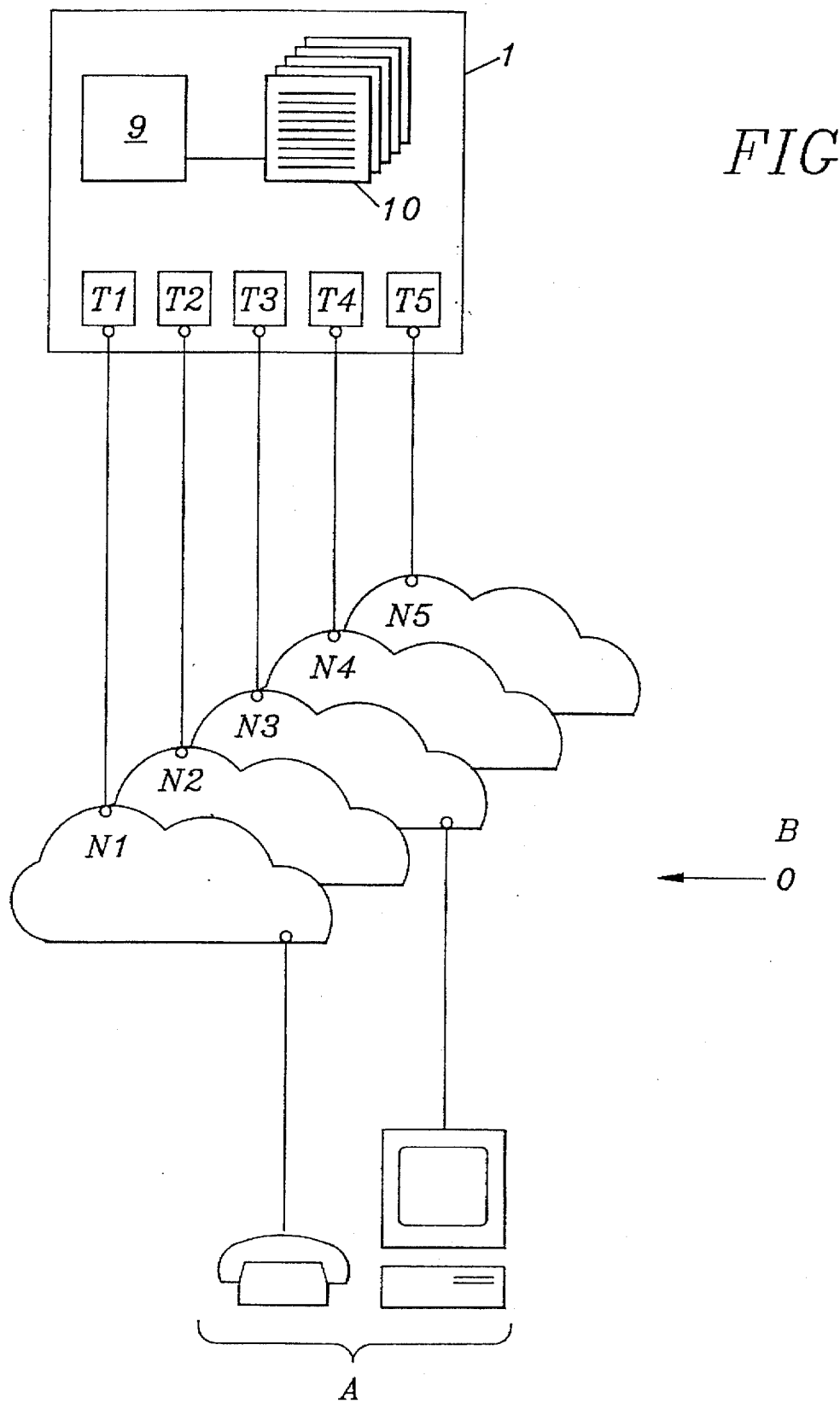
FIG. 4 is a block schematic similar to the block schematic of FIG. 3, illustrating an inventive paging method which can be used by a party which lacks a terminal unit but which has access to such a unit, the environment in which the paging method is used being the environment illustrated in FIG. 1.

FIG. 4 is a block schematic similar to the block schematic of FIG. 3, but with the exception that the paged user B has no terminal equipment but has nevertheless subscribed to the paging service. In this case, it suffices for the user B to have access at some time to one of the networks N1-N5. For instance, the user B may borrow or hire the terminal equipment of another user and in this way communicate with the paging central 1 to enquire whether any messages have been left for him. It can be said that in this case the service used by user B is similar to a poste restante service. If messages addressed to user B are found at the paging central, the paging central delivers the message, or messages, to user B and user B acknowledges receipt of the message or messages in the usual way.

It will be evident from the aforegoing that the user A need not have knowledge of the access ports of the paged user in any of the networks. All this information is stored in the paging central 1. Neither need the paging central have knowledge of the access ports of the paged user when the paged user utilizes the message transmission service according to FIG. 4. When the paging user B avails himself of the message transmission service according to FIG. 4, it is unnecessary for the paging central to send an alerting signal to user B, since user B has no terminal equipment.

Figure 5:
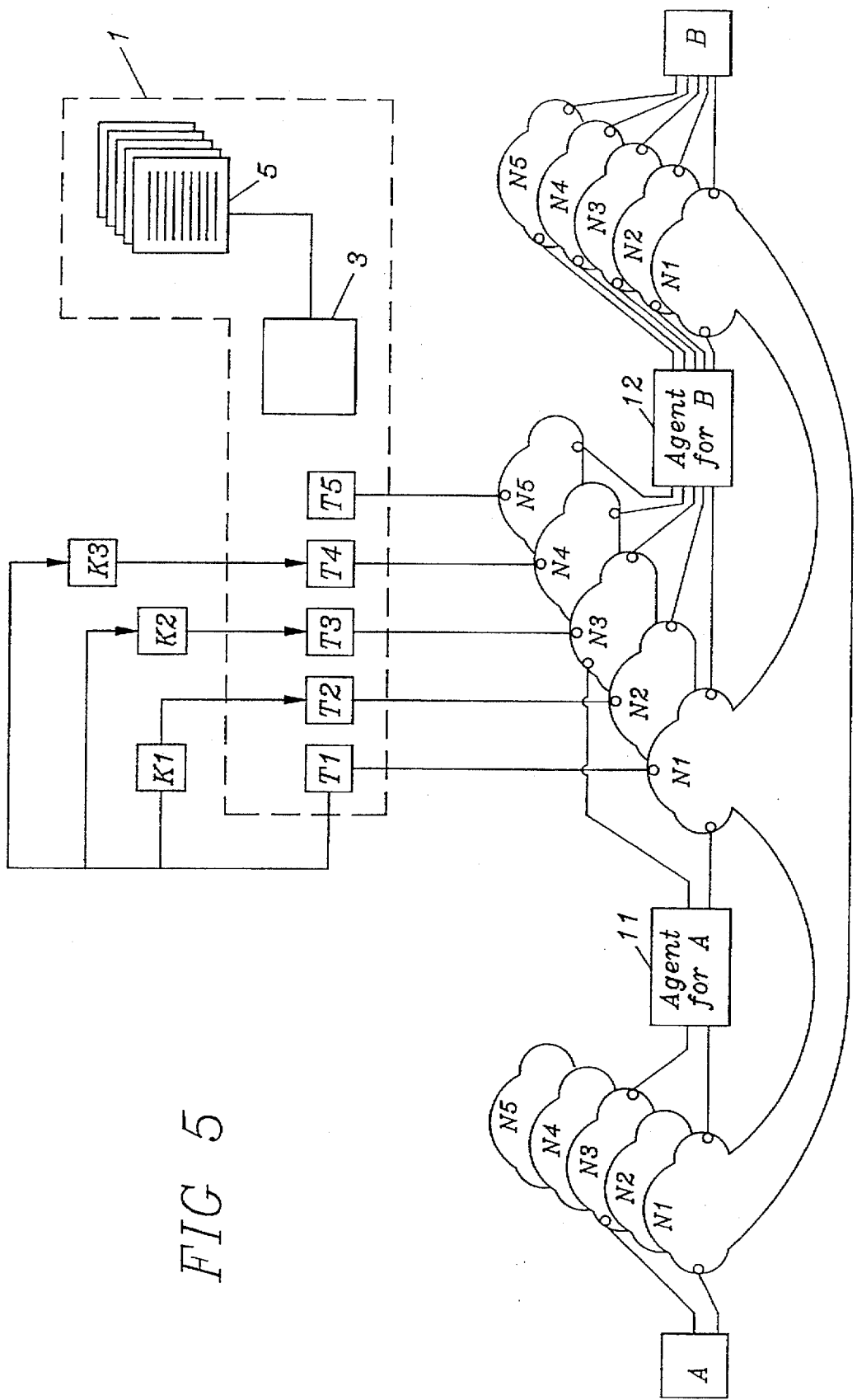
FIG. 5 is a block schematic which illustrates schematically the terminals that are included in a telecommunication system which utilizes the inventive paging method when it is used in the environment shown in FIG. 2.

FIG. 5 is a block schematic illustrating how the inventive paging method is applied in an environment of the kind illustrated in FIG. 2. Reference K1 identifies conversion equipment which enables signals in the network N1 to be converted to signals that are understood by network N2, and vice versa. Reference K2 identifies conversion equipment which enables signals from the network N2 to be converted to signals that are understood by the network N3, and vice versa. Reference K3 identifies corresponding equipment for converting signals from network N3 to network N4, and vice versa, i.e., from N4 to N3. In the illustrated case, the paging user A does not himself request paging by the paging central, but assigns this task to his agent 11. The paged user B is also represented by an agent 12. Respective agents handle all communication with the paging central 1. The agent A contacts his agent 11 when wishing to order paging of user B. This contact is effected over one of those networks found between user A and his agent 11. In turn, the agent 11 contacts his employer A only when he has received acknowledgement that the paged user B has acknowledged the paging message. If user B has left a reply message, the agent 11 sends this message together with the acknowledgement. According to one preferred embodiment of the invention, the agent 12 of the paged user B requests the transfer of a message immediately the paged user B is alerted. The agent 12 then stores the message. In this way, several messages can be stored with the agent 12. When the paged user B wishes to check whether or not messages are found addressed to him, the user B contacts his agent 12 and the agent 12 informs user B of any messages which are found and the paged user B then requests his agent 12 to send him those messages which he wishes to receive. No acknowledgement of the receipt of a message is sent from agent 12, together with any reply messages from the user B, until the user B has received the message or messages. As with the earlier case, an acknowledgement can be sent either to the paging central or to the message storage place.

The possibility of storing the message with the sender and the short title with the paging central is beneficial in the following situations: Two users are initially located in the same country and have a common paging central. One user then moves temporarily to another country or to another continent where he can still be reached by the common paging central. When a user on the new continent or in the new country wishes to send a message to the user who is in temporary residence in said continent or said country, it is convenient to store the short title in the common paging central while storing the actual message with the sender in the new country or on the new continent. This obviates the need to transmit the message unnecessarily over long distances.

The situation is synonymous, for instance, to two long trailers which have a common paging central in one country and are journeying to another country, perhaps even along the same route and separated only 20 m apart, where one long trailer wishes to transmit a message to the other. Under such circumstances, it is more suitable for the paging user to himself store the message while storing the short title in the paging central in the home country.

Figure 6:
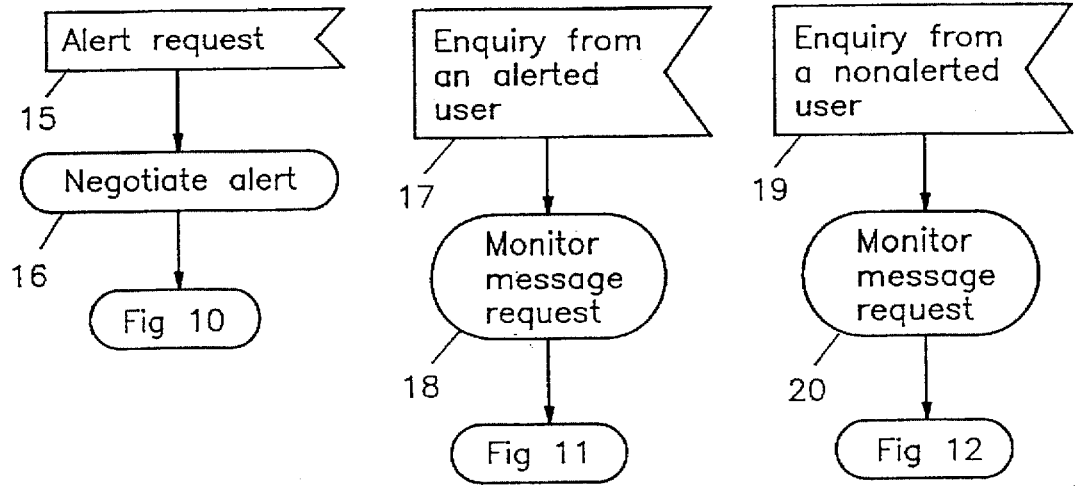
FIGS. 6–12 are different constitutional diagrams for asynchronous, switched sequences and illustrate those processes which are used in the inventive paging method.
Figure 6:
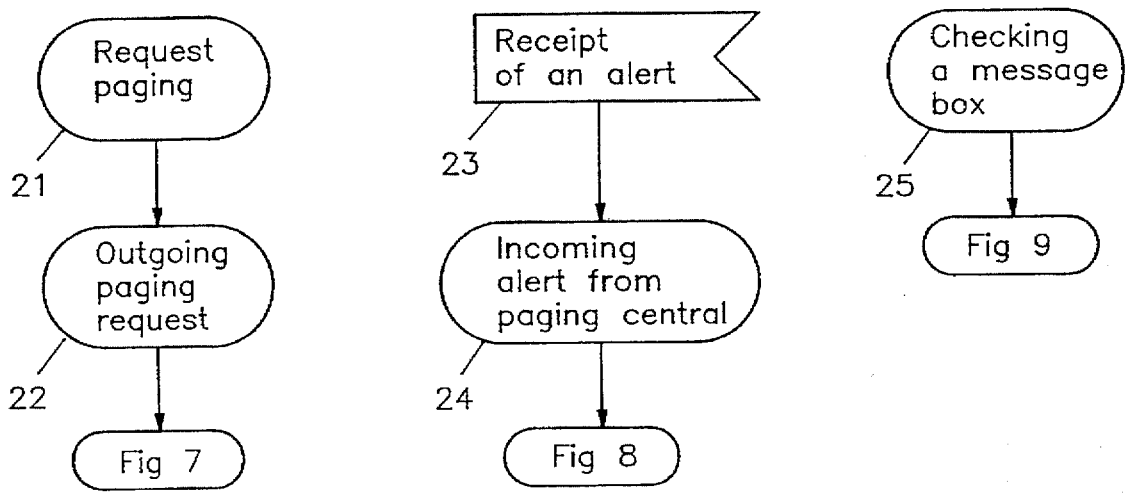

FIG. 6 is a diagram which illustrates the asynchronous, switched sequences or activities that occur in the paging central and with a user respectively. The procedure that takes place in the paging central is shown at the top of FIG. 6 while the procedures that take place with a user are shown at the bottom of FIG. 6. The double horizontal lines 13, 14 represent a basic state of the paging central and of the user respectively. Although the paging process is activated in the basic state, no activity takes place at either the paging central or at the user. The paging central may receive a user alert request, i.e., a request to page a user. This is shown in box 15 in FIG. 6. The paging central then puts through an alert in box 16. The manner in which this alert is put through is described below with reference to FIG. 10. The paging central may also receive an enquiry from an alerted user in box 17. In this case, the paging central discloses an updating identity AI which relates the stored message to the alerted user. The paging central then monitors the situation in order to ascertain whether or not the alerted user makes a message request in box 18. The manner in which this takes place is illustrated in FIG. 11. Finally, the paging central may receive an enquiry as to whether a message is found for collection, this enquiry coming from a non-alerted user, i.e., a user who wishes to avail himself of the paging process in a manner similar to a poste restante procedure. This process could be referred to as a telerestante process. This enquiry is shown in box 19 and, similar to box 17, means that updating information is transmitted to the user. The paging central shall then monitor the procedure so as to ascertain whether or not the user makes a request for the message to be transmitted in box 20. The manner in which this takes place is illustrated in detail in FIG. 12.

Figure 7:
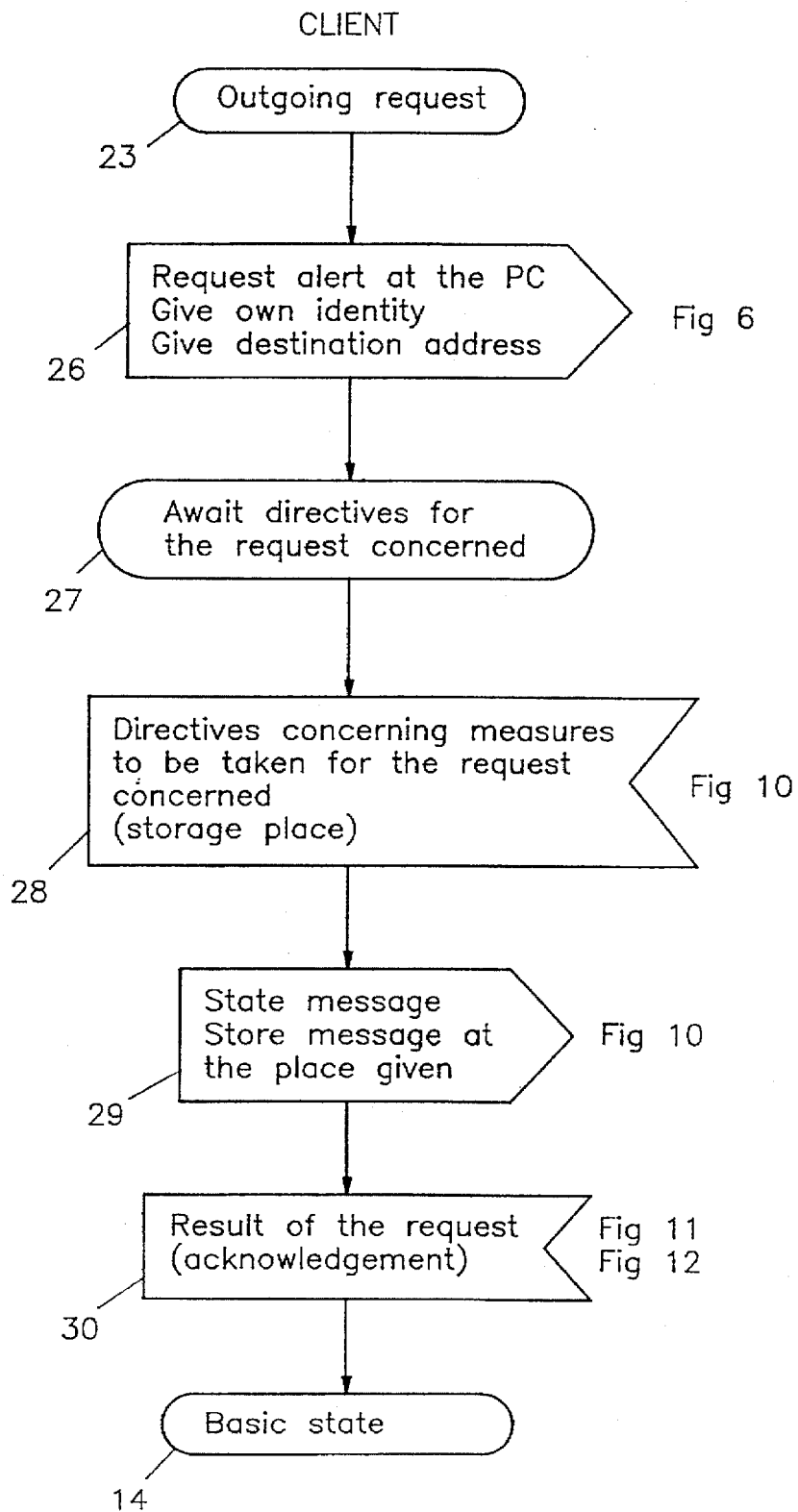

Three different types of user activities can be carried out, as illustrated at the bottom of FIG. 6. For instance, the user may wish to request a paging process in box 21. This results in the user making an outgoing request in box 22. The manner in which this request is made is shown in FIG. 7. Another user activity is one in which the user is alerted in the aforedescribed manner. This alert signal may arrive from an external source and is shown in box 23. The alert incoming from the paging central in box 24, is processed in the way illustrated in FIG. 8. Another user activity is one in which the user wishes to check whether or not a message addressed to the user is found stored in some storage place, i.e., the tele-restante activity. This activity is shown in box 25 and the manner in which the check is made is illustrated in FIG. 9.

FIG. 7 illustrates the sequence of events that take place when the user makes an outgoing request. The user requests an alert at the paging central in box 26, and gives his own identity and the identity of the paged person, e.g. by stating the paged person's access point in one of those networks at the disposal of the paged person. The requesting user may also inform the central of those paging networks in which paging shall take place. The customer then awaits directives relating to the paging request concerned in box 27. The requesting user obtains these directives from the paging central, which informs the user as to where the message shall be stored in that case when the paged user and the paging central have previously agreed on a specific storage place. Directives in this respect are obtained in box 28. The requesting user then stores the message at the place stated by the paging central in box 29. The requesting user has then only to await the result of his request in box 30, in other words the requesting user waits for an acknowledgement of the receipt of the message. This acknowledgement may be accompanied by a reply message from the paged user. The procedure then reverts to the basic state 14.

Figure 8:
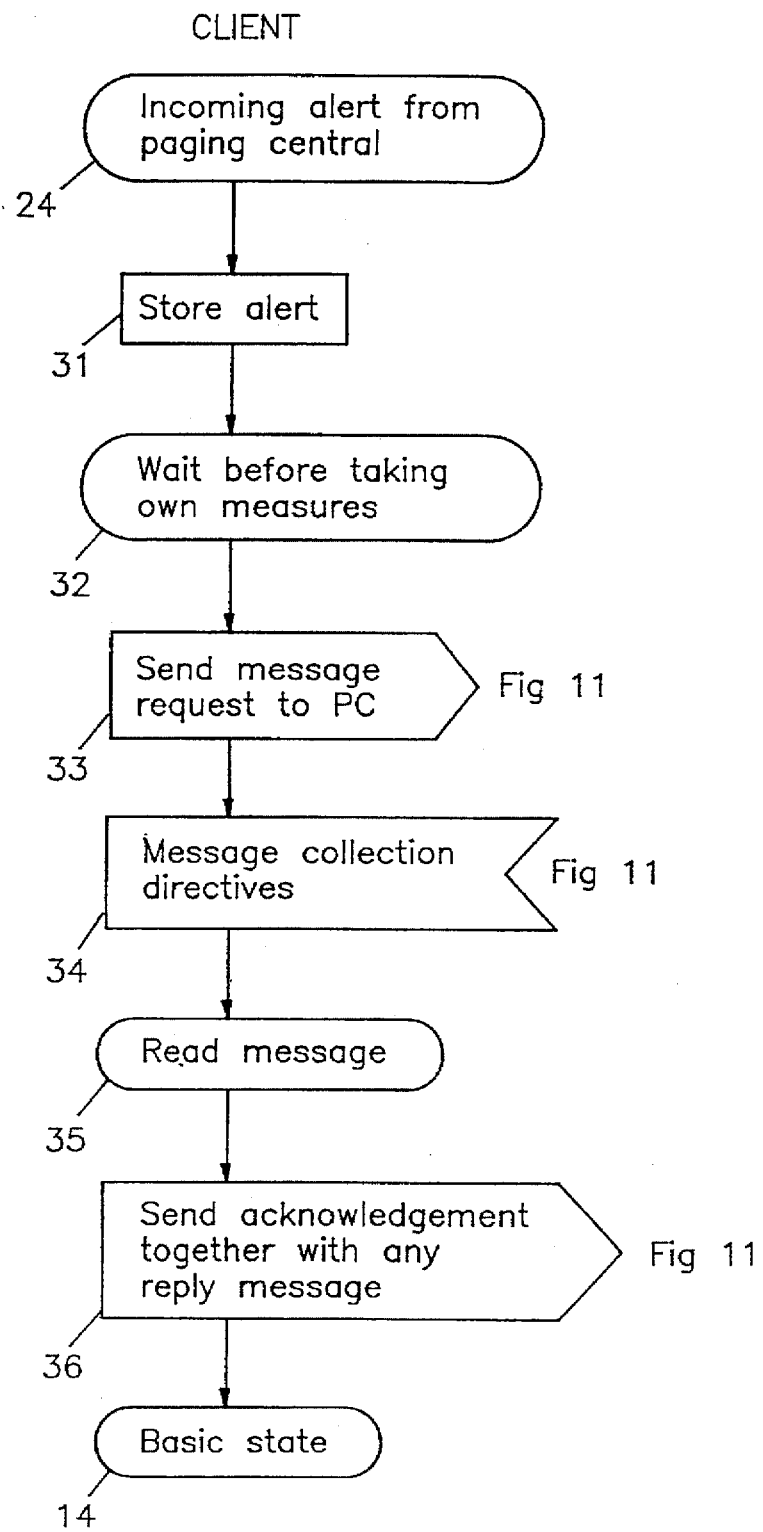

FIG. 8 illustrates the sequence of events that take place when a user is alerted by the paging central. This alert is stored in box 31, either in a memory associated with the user's terminal or in the user's head. Several alerts may arrive from the paging central. These alerts may all have different origins or some of the alerts may arrive from the same origin. At this stage, the paged user need not take any particular measures, but may contact the paging central at some time which is convenient to him and request to be informed of those messages about which he has been alerted. Box 32 indicates that the user shall wait before commencing his own activities, while box 33 indicates the event in which the user makes contact with the paging central and requests for messages to be transferred. FIG. 11 shows the activities of the paging central upon receipt of this message request. Among other things, the paged user receives message collection directives in box 34, these directives including, among other things, transmission of the updating identity together with a short title of the message. If the message is stored at some other place, the user is also informed of the address of the message to be collected. If the user has had several alerts, several updating identities will be found and these can then be transmitted to the paged user together with corresponding short titles. On the basis of these short titles, the paged user is then able to inform the paging central of those messages which the paged user wishes to be sent to him. If the messages lack short titles, the updating information may also contain information relating to the sender and the paged user can decide which messages shall be sent to him, on the basis of this updating information. The updating information may also include a time stamp. After having read the transmitted message, the user will then send an acknowledgement confirming receipt of the message, together with any reply message, to the paging central or to the message storage place or to both, depending on how the system is designed. This is shown in box 36. The activities are then terminated and the paged person returns to the basic state 14.

Figure 9:
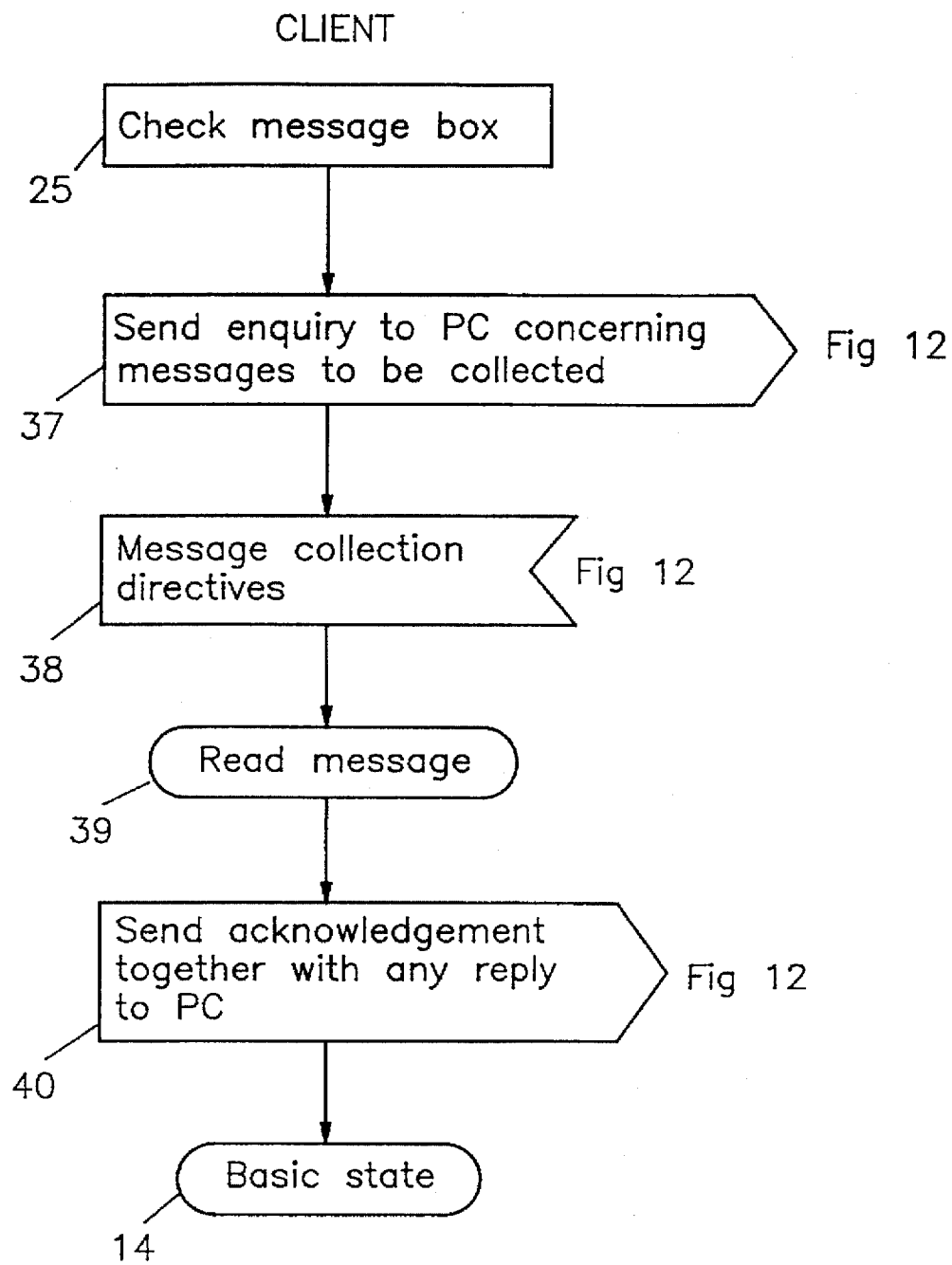

FIG. 9 illustrates the last of those activities which can occur on the user side, namely the activity in which the user wishes to check whether or not a message or messages addressed to the user is/are to be collected. This may apply when a user is aware that an important message can be expected. This situation may also apply when a user who lacks his own terminal equipment and who uses or hires someone else's terminal equipment for communication with the paging central and sends to the paging central an enquiry as to whether there is a message addressed to the user for collection in box 37. Similar to the manner described with reference to box 34 in FIG. 8, the user obtains message-collecting directives in box 38. When the user has read the message in box 39, he sends an acknowledgement, together with any reply message, to the paging central, or to the message storage place, or to both, depending upon the design of the system box 40. This checking activity is then terminated and the user returns to the basic state 14.

Figure 10:
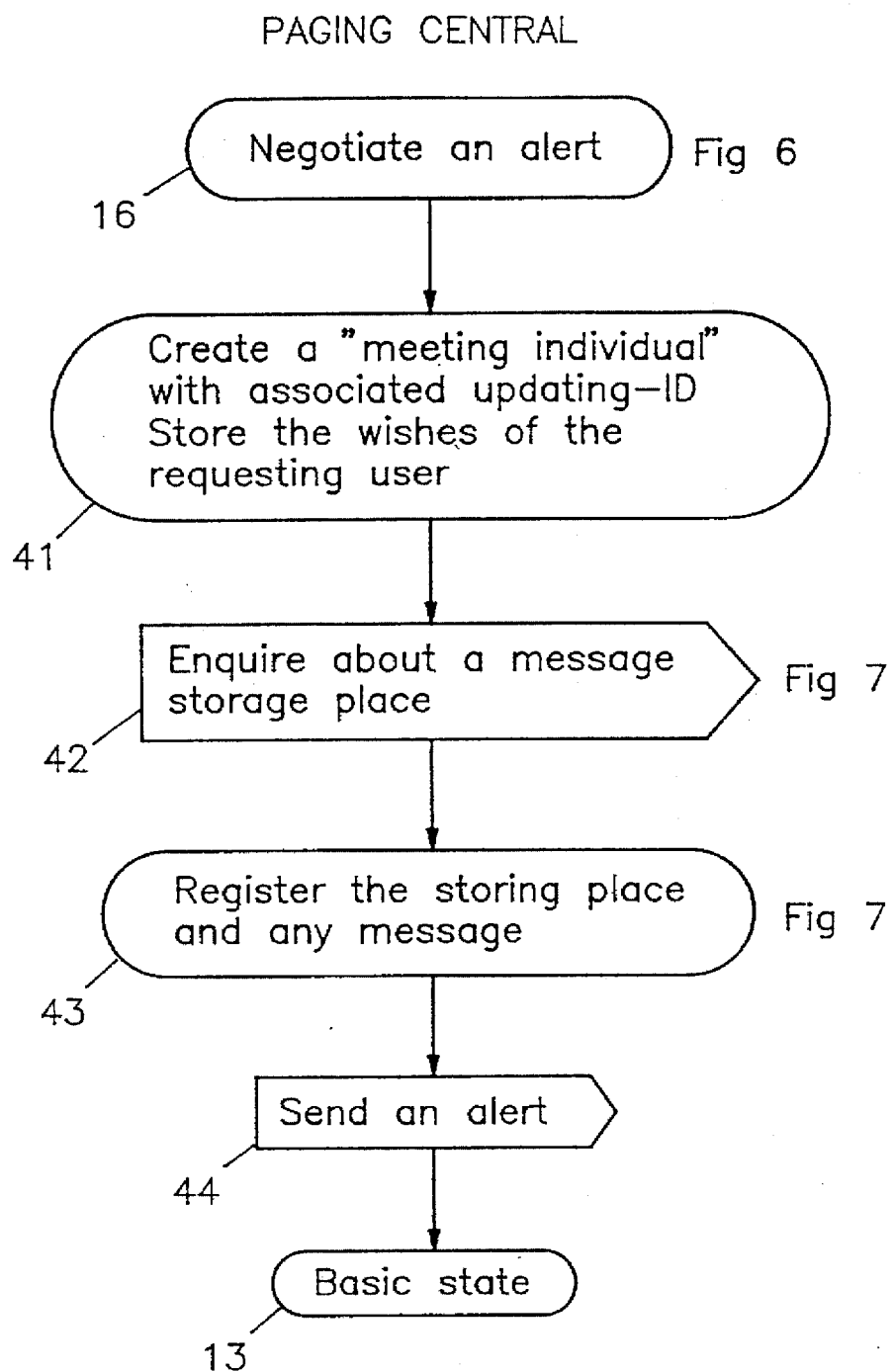
Figure 11:
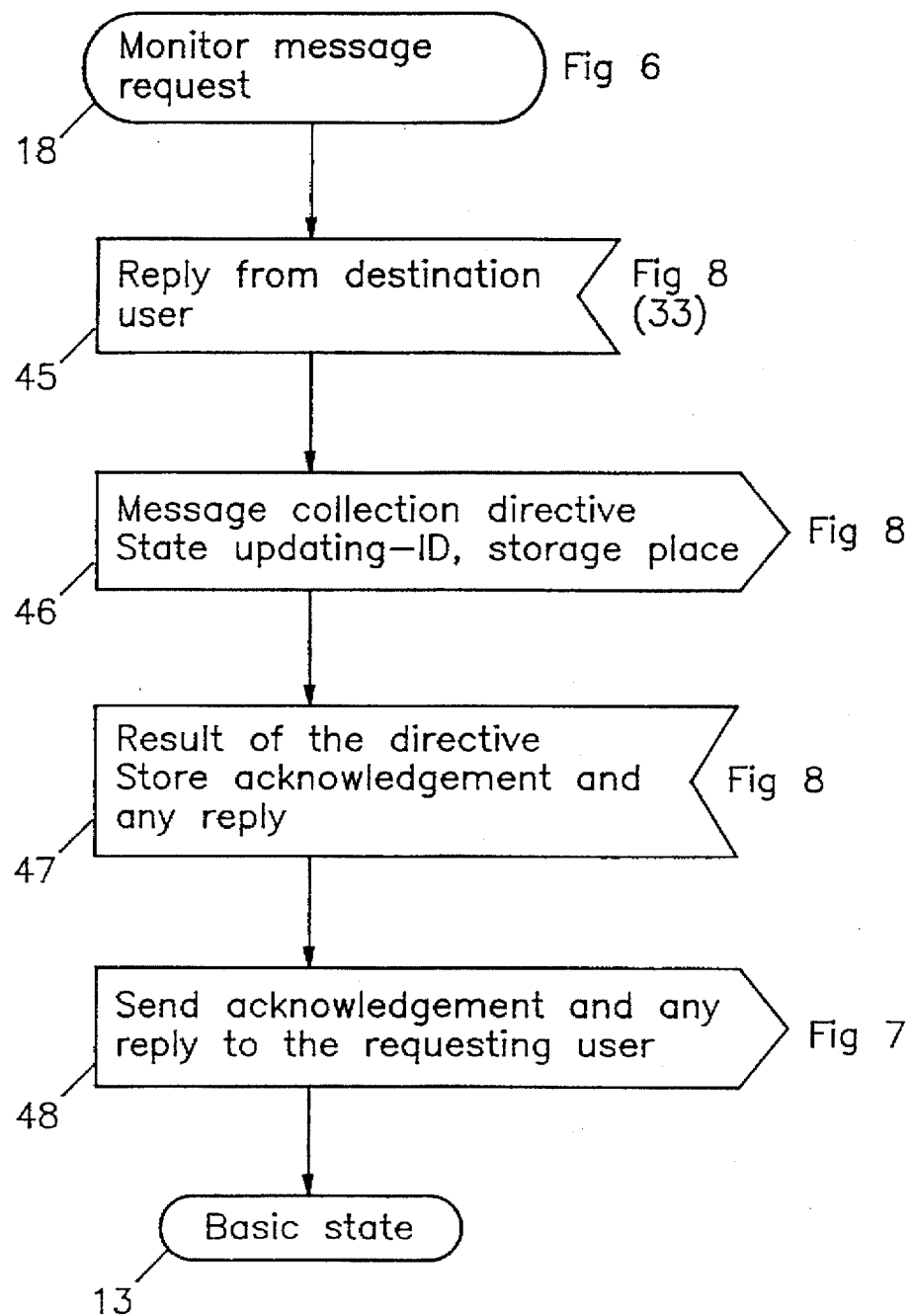

FIG. 10 illustrates the activities carried out by the paging central in conjunction with performing an alerting process: The paging central must first create a "meeting individual" and store the wishes of the requesting user in box 41. By meeting individual it is meant a data structure. The meeting individual is unique to precisely this individual alert process and includes data relating to the requesting user, updating ID, the receiver, the wishes of the requesting user, information relating to acknowledgement of a received message, any alert and acknowledgement time stamps used and, when applicable, also the message delivered by the requesting user. By "meeting", it is meant that both parties meet in an intermediary, namely the paging central. After creating the meeting individual, the paging central asks the requesting user where the message shall be stored in box 42. If the paged user has earlier informed the paging central of a desired message storage place, the whereabouts of this storage place is disclosed to the requesting user. If the requesting user desires a special storage place in the paging central registers this place, box 43. In the absence of any particular wishes with regard to the message storage place, the message can be stored in the paging central. Optionally, only a short title is stored in the paging central while the message itself is stored with the requesting user. When the meeting individual is complete and the storage place has been decided, the paging central broadcasts an alerting signal on that network or those networks which is/are at the disposal of the paged user. As described in the introduction, the alerting signal can be sent on all networks simultaneously, or in sequence from network to network, or first in solely certain priority networks and then in other networks of lower priority. The paging central returns to the basic state 13 when transmission of the alerting signal is complete.

FIG. 11 illustrates monitoring of a message request in the paging central. When the destination user B sends an enquiry asking whether a message is found for collection in box 37, or sends a message request in accordance with box 33, the paging central receives a reply from the destination user. This is represented by box 45. The paging central now issues directives to the destination user, in accordance with the information stored in the meeting individual or meeting individuals relating to the destination user. Among other things, the paging central states the updating identity AI, which in accordance with a preferred embodiment of the invention is an alphanumeric sign or character which indicates the name of the requesting user. When the message is stored with a short title, the paging central will also send the short title of the message associated with the updating identity. The paging central also informs the destination user from where the message can be collected. All these message collecting directives are shown in box 46. As a result of the message collecting process, the destination user sends a message received acknowledgement in box 47. This acknowledgement may possibily be supplemented with a response message. The acknowledgement is stored in the meeting individual together with any response message. Depending on how the system is designed, the acknowledgement may be sent to the requesting user, box 48, either in conjunction with the paging central receiving the acknowledgement from the destination user or on the next occasion that the requesting user calls the paging central. The paging central then returns to the basic state 13.

Figure 12:
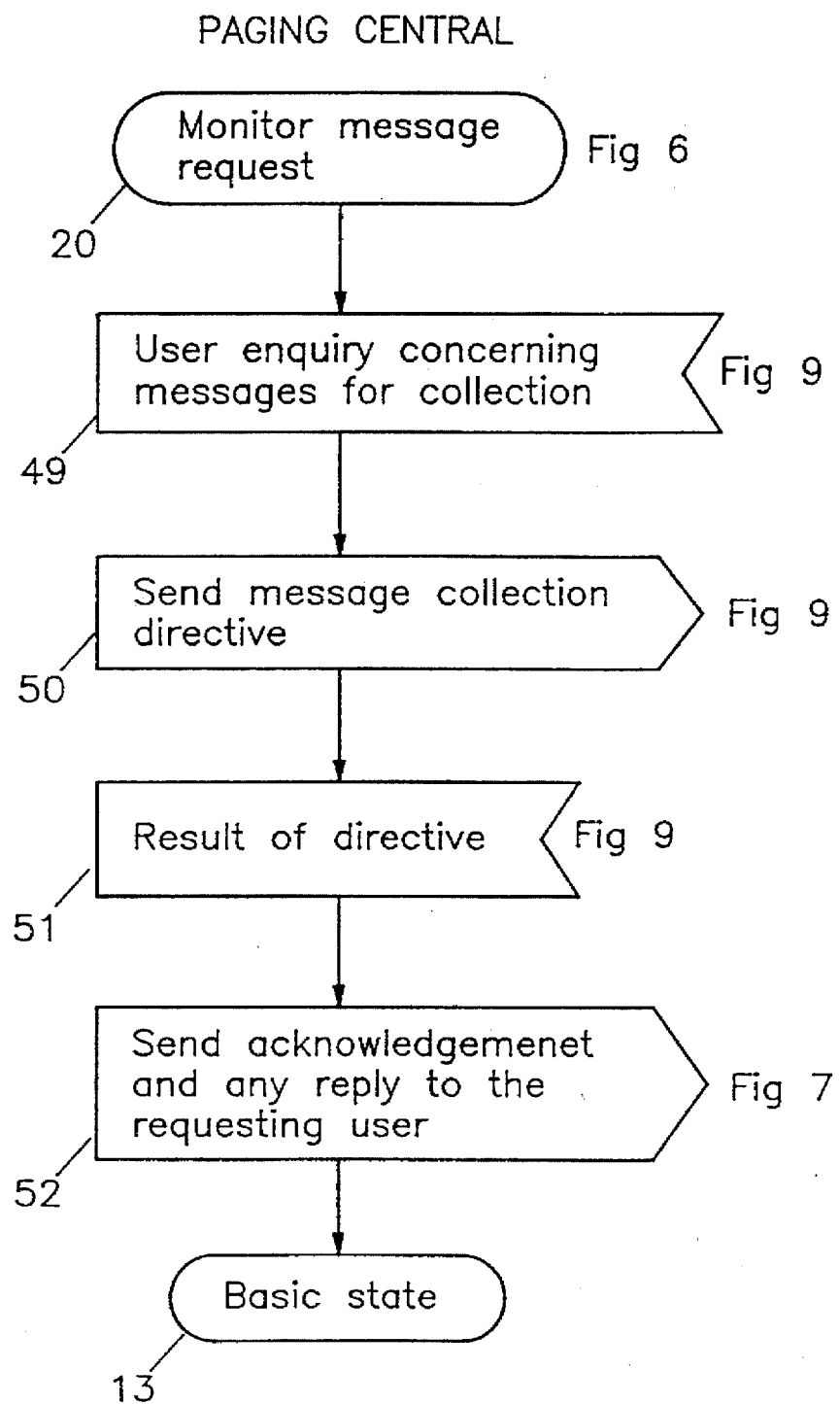

FIG. 12 shows the last sequence carried out in conjunction with the monitoring of a message request at the paging central. A user enquires as to whether a message addressed to the user is found for collection. This is represented by box 49. The paging central now pages all meeting individuals in order to establish those updating identities which have the enquiring user as their destination. The paging central transmits all updating identities and optionally short messages and optionally also information concerning the message storage places. This is represented by box 50. Box 51 represents those activities which occur subsequent to the enquiring subscriber having collected a message. Among other things, the paging central receives an acknowledgement and possibly also a reply message. The acknowledgement and the reply message are stored in the meeting individual from which the message was collected. The paging central then sends this acknowledgement and the possible reply to the requesting user in box 52. Similar to the afore-described, this acknowledgement may be sent the next time the requesting user calls the paging central, or the acknowledgement can be sent to the requesting user without said user needing to take any other activity. The paging central then returns to the basic state 13.

Figure 13:
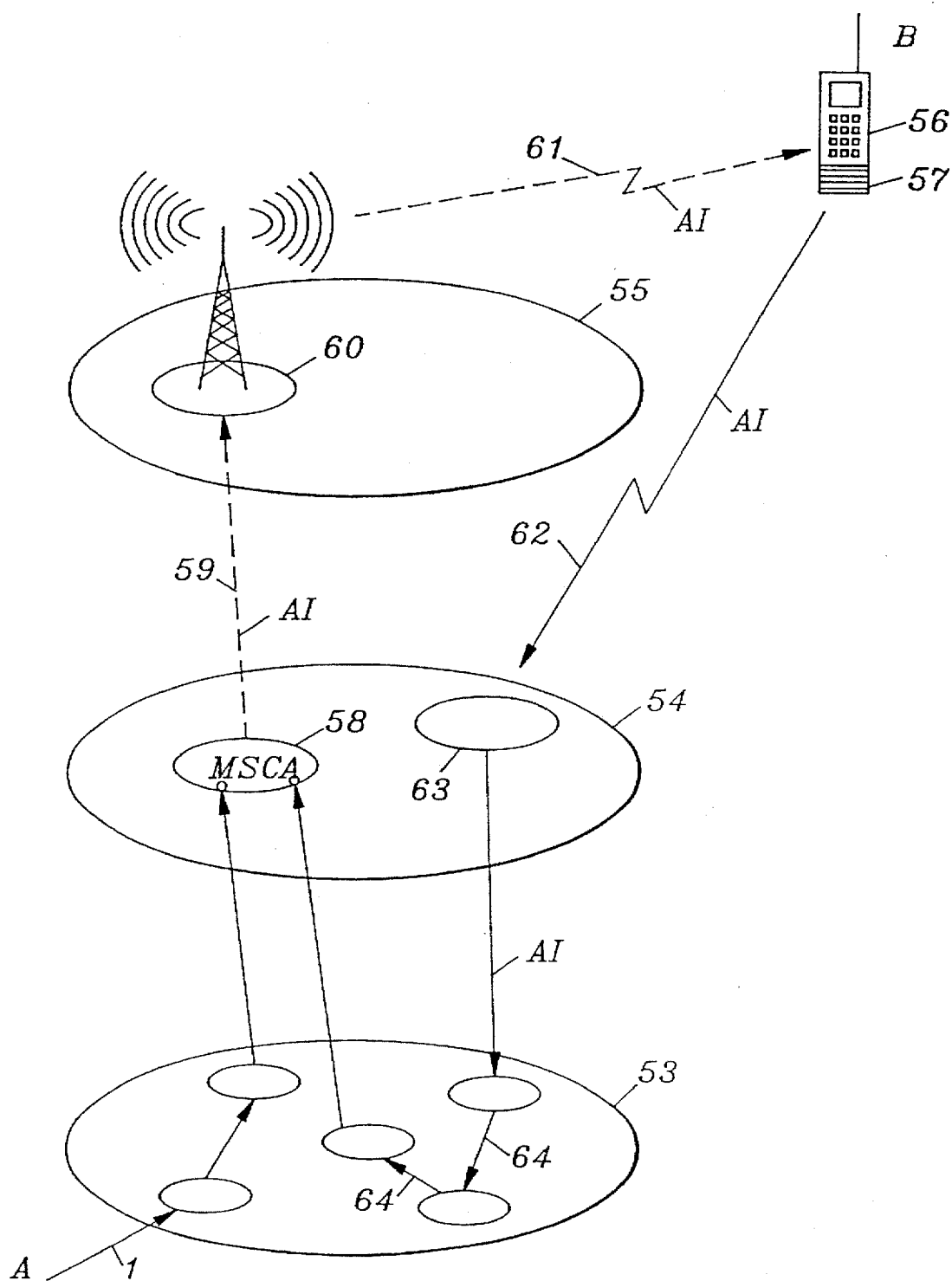
FIG. 13 illustrates an example of the invention when the invention is applied in a multi-network environment together with telephony, personal paging and mobile telephony.

FIG. 13 illustrates the invention as applied in association with the standard telephone network, referenced 53, the mobile telephone network, referenced 54 and the paging network, referenced 55. A mobile telephone 56 having an integrated pager 57 is of a kind similar to that described in our aforementioned U.S. patent application Ser. No.686,600 entitled "communication System for Integrating a Paging System with Cellular Radio Telephones". As symbolized by the arrow 1, a user A makes a call in the telephone network 53 to a user B who is equipped with the combined car telephone and pager 56/57, hereinafter called a paging mobile. The user A gives the mobile telephone number of user B when making the call. Subsequent to routing in the telephone network 53, the call arrives at a mobile telephone station MSCA, referenced 58. The mobile telephone station functions as a paging central and has information relating to the mobile telephone subscribers, among other things, their paging numbers. The mobile telephone station 58 assigns to the incoming call an updating identity AI which is an interaction number of the kind described in copending U.S. patent application Ser. No. 08/018,268 entitled "A Method of Establishing Cooperation with a Functionality". Among other things, this implies that the updating identity is chosen from the number series of the mobile telephone station 58, more specifically from among those numbers to which no equipment is connected. In conjunction with receiving the call from user A, there is initiated in the mobile telephone station an assignment process which creates a meeting identity in the form of a data record which contains several data fields, there among a data field which refers to the meeting individual, another field in which the updating identity is found, and a third data field in which that port on which the call from A arrived is noted. The assignment process parks the call from A and then searches the register in which B is found and in which the paging number of B is given. The next step in the process, symbolized by the broken arrow 59, involves the mobile telephone station sending a request for paging of user B via the paging network. The updating identity is sent together with B's paging request. The paging request goes to a paging central 60 which transmits a paging message together with the updating identity. This paging message is shown symbolically by the broken arrow 61. The paging apparatus 57 in B's paging mobile receives the paging message and alerts the mobile telephone 56. The mobile telephone 56 now makes an outgoing call, symbolized by the full arrow 62, giving the updating identity AI as the destination address. This outgoing call is seized by a base station (not shown) which sends the call further to a mobile telephone station 63 which serves the base station in which the call is seized or captured. The mobile telephone station 63 treats the call as a conventional outgoing call and sends the call further to the telephone network 53, where the call is routed through different switching stations until a main switching station finds, by number analysis, that the call is concerned with a mobile telephone call and that the call shall, in fact, be directed to the mobile telephone station 58, since the updating information states this node as the destination address. This routing of the call in the telephone network is shown by the full arrow 64. When this outgoing call arrives at the mobile telephone station 58, the mobile telephone station discovers the presence of an incoming call which refers to the updating identity AI. The mobile telephone station 58 then looks for the purpose for which this updating information was assigned and finds that the information is associated with the meeting identification created by A's incoming call. The mobile telephone station 58 now connects A's parked call with the outgoing call 64 from B, and A and B are able to converse. When either party replaces his telephone receiver, the connection is disconnected, the meeting individual is annulled and the updating identity AI is released. The released updating identity AI can then be reused for future paging processes.

It will be noted that the paging mobile 56/57 differs from the paging mobile described in our aforesaid U.S. patent application Ser. No. 686,600, in that the mobile telephone 56 itself rings-out instead of being rung, subsequent to the paging apparatus 57 being alerted.

It is thus evident that the inventive paging process separates the message service from the alerting service, in that the message service is first activated upon the request of the paged user. The paging process also enables an alert to be sent over several networks. It is also possible for the paged user to obtain access to the updatings over several networks. It is thus the paged user who decides when his messages shall be transmitted. Furthermore, it is also possible to acknowledge not only the receipt of a message but also the receipt of an alert and to deliver a message to the user requesting the paging service. The paging service is therewith a high-class service.

The inventive paging method can be combined with the meeting updating service described in copending U.S. patent application Ser. No. 08/018,223 entitled; "A Method of Organizing Communication". When an interactive meeting is to be organized between two parties, the meeting broker can use the paging method according to the present invention.

I claim:

1. A multi network paging method in which a first user wishes to page a second user and deliver a message, comprising the steps of:

said first user requesting paging of the second user by sending, over a paging network, a paging request to a paging central;

said paging central in response to said paging request (i) selecting a storage place for said message in any of a multitude of telecommunication networks, said paging network included, to which said second user has access, (ii) generating reference indication associated with said message and said storage place, and (iii) initiating the storing of said message at said selected storage place;

said paging central paging said second user by transmitting an alerting signal and said reference indication in any of said multitude of telecommunication networks;

said second user receiving said alert signal and storing said reference indication;

said second user, when convenient for said second user to pick up said message, (i) selecting from among said multitude of telecommunication networks, a message delivery network for delivery of said message and (ii) sending, in any of said multitude of telecommunication networks, a message pick up request comprising said reference indication in order to initiate pick up of said message.

2. A multi network paging method according to claim 1, wherein said message delivery network is selected from among said multitude of telecommunication networks, said paging network excluded, thus relieving the traffic load of said paging network.

3. A multi network paging method according to claim 2, wherein said reference indication comprise a destination address and a message identifier.

4. A multi network paging method according to claim 3, wherein said destination address leads to said paging central, said message pick up request being directed to said paging central.

5. A multi network paging method according to claim 4, wherein said message is associated with a short title, and wherein only the short title is transmitted in response to said message pick up request.

6. A multi network paging method according to claim 5, wherein said second user, after reading said short title, orders delivery of the complete message over said message delivery network.

7. A multi network paging method according to claim 6, wherein an acknowledgment signal is transmitted by said second user in order to acknowledge the reception of said message.

8. A multi network paging method according to claim 3, wherein said destination address leads to said message storing place, said pick up request then being directed to said message storage place.

9. A multi network paging method according to claim 8, wherein said message is associated with a short title, and wherein only the short title is transmitted in response to said message pick up request.

10. A multi network paging method according to claim 9, wherein said second user, after reading said short title, orders delivery of the complete message over said message delivery network.

11. A multi network paging method according to claim 6, wherein an acknowledgment signal is transmitted by said second user in order to acknowledge the reception of said message.

12. A multi network paging method according to claim 8, wherein said storage place is selected dependent on the geographical site from which said paging request originates.

* * * * *